(12) United States Patent
Hodel et al.

(10) Patent No.: US 10,772,255 B2
(45) Date of Patent: Sep. 15, 2020

(54) SEED FIRMER WITH RESILIENT INSERT

(71) Applicant: PRECISION PLANTING LLC, Tremont, IL (US)

(72) Inventors: Jeremy Hodel, Morton, IL (US); Kent Levy, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 65 days.

(21) Appl. No.: 14/437,995

(22) PCT Filed: Oct. 24, 2013

(86) PCT No.: PCT/US2013/066652
§ 371 (c)(1),
(2) Date: Apr. 23, 2015

(87) PCT Pub. No.: WO2014/066664
PCT Pub. Date: May 1, 2014

(65) Prior Publication Data
US 2015/0250094 A1    Sep. 10, 2015

Related U.S. Application Data

(60) Provisional application No. 61/718,106, filed on Oct. 24, 2012.

(51) Int. Cl.
*A01C 5/06* (2006.01)
*A01C 7/20* (2006.01)

(52) U.S. Cl.
CPC ............... *A01C 5/068* (2013.01); *A01C 7/20* (2013.01); *A01C 7/205* (2013.01)

(58) Field of Classification Search
USPC ................. 111/150, 189, 197; 264/275, 278
See application file for complete search history.

(56) References Cited

U.S. PATENT DOCUMENTS

| | | | | |
|---|---|---|---|---|
| 1,935,416 A | * | 11/1933 | Reynolds | A01B 19/04 172/142 |
| 2,581,532 A | * | 1/1952 | Hem | A63C 5/12 280/610 |
| 3,464,376 A | * | 9/1969 | Johnson | A01C 7/04 111/51 |
| 4,872,412 A | * | 10/1989 | Zollinger | A01C 23/025 111/121 |
| 5,376,325 A | * | 12/1994 | Ormson | B29C 45/1671 264/254 |

(Continued)

FOREIGN PATENT DOCUMENTS

| | | | | |
|---|---|---|---|---|
| DE | 4206534 A1 | * | 9/1993 | ....... B29C 45/14065 |
| EP | 173565 A2 | | 3/1986 | |
| WO | 2012129442 A2 | | 9/2012 | |

OTHER PUBLICATIONS

International Search Report, dated Mar. 18, 2014, pp. 1-12.

(Continued)

*Primary Examiner* — Alicia Torres

(57) ABSTRACT

A seed firmer for firming seeds deposited in the seed trench to ensure good seed-to-soil contact. A bracket mounts the seed firmer to the row unit frame such that the seed firmer is aligned with the seed trench. The seed firmer includes a resilient insert positioned in the firmer body to stiffen the seed firmer to more resiliently firm the seed into the soil.

22 Claims, 11 Drawing Sheets

(56) References Cited

U.S. PATENT DOCUMENTS

| | | | |
|---|---|---|---|
| 5,425,318 A | 6/1995 | Keeton | |
| 5,730,074 A | 3/1998 | Peter | |
| 6,082,274 A * | 7/2000 | Peter | A01C 5/06 |
| | | | 111/118 |
| 6,289,829 B1 * | 9/2001 | Fish | A01C 5/064 |
| | | | 111/121 |
| 6,314,897 B1 | 11/2001 | Hagny | |
| 6,453,832 B1 | 9/2002 | Schaffert | |
| 6,666,156 B1 * | 12/2003 | Mayerle | A01C 5/064 |
| | | | 111/150 |
| 6,790,398 B1 * | 9/2004 | Ejima | A63H 3/04 |
| | | | 264/251 |
| 6,892,656 B2 | 5/2005 | Schneider | |
| 7,044,070 B2 | 5/2006 | Kaster et al. | |
| 8,881,663 B2 * | 11/2014 | Ryan | A01B 15/00 |
| | | | 111/190 |
| 2011/0146548 A1 | 6/2011 | Sauder et al. | |
| 2013/0291773 A1 | 11/2013 | Peter | |

OTHER PUBLICATIONS

European Search Report, dated Jun. 10, 2016, pp. 1-5.
Exapta Solutions. Mojo Wire Stiffiner for Keetons. Dec. 2005 (retrieved on Feb. 25, 2014 from http://www.exapta.com/products/mojo_wires.html).
Exapta Solutions. Mojo Wires, Keeton Planters, Seed Firmers, No-Till Equipment Parts (retrieved Jul. 7, 2016 from http://exapta.com/products/mojo-wire-for-planters).
BR Office Action, Application No. BR112015009080-0, dated Jul. 10, 2019, 8 pages.

* cited by examiner

SEED FIRMER WITH RESILIENT INSERT

BACKGROUND

In recent years, farmers have recognized the need to enhance seed-to-soil contact in order to create the proper environment for seed germination and emergence after planting. Seed firmers have thus been developed for pressing the seed into the soil subsequent to placement in the seed trench. However, existing firmers have varying effectiveness in certain soil conditions and soil types. Additionally, the increased pressure to perform planting operations at high speeds have in some cases limited the effectiveness of existing firmer designs. Thus, there is a need for a seed firmer for an agricultural planter row unit providing for more effective firming of the seed resulting in improved seed-to-soil contact.

DESCRIPTION

Figure 1:
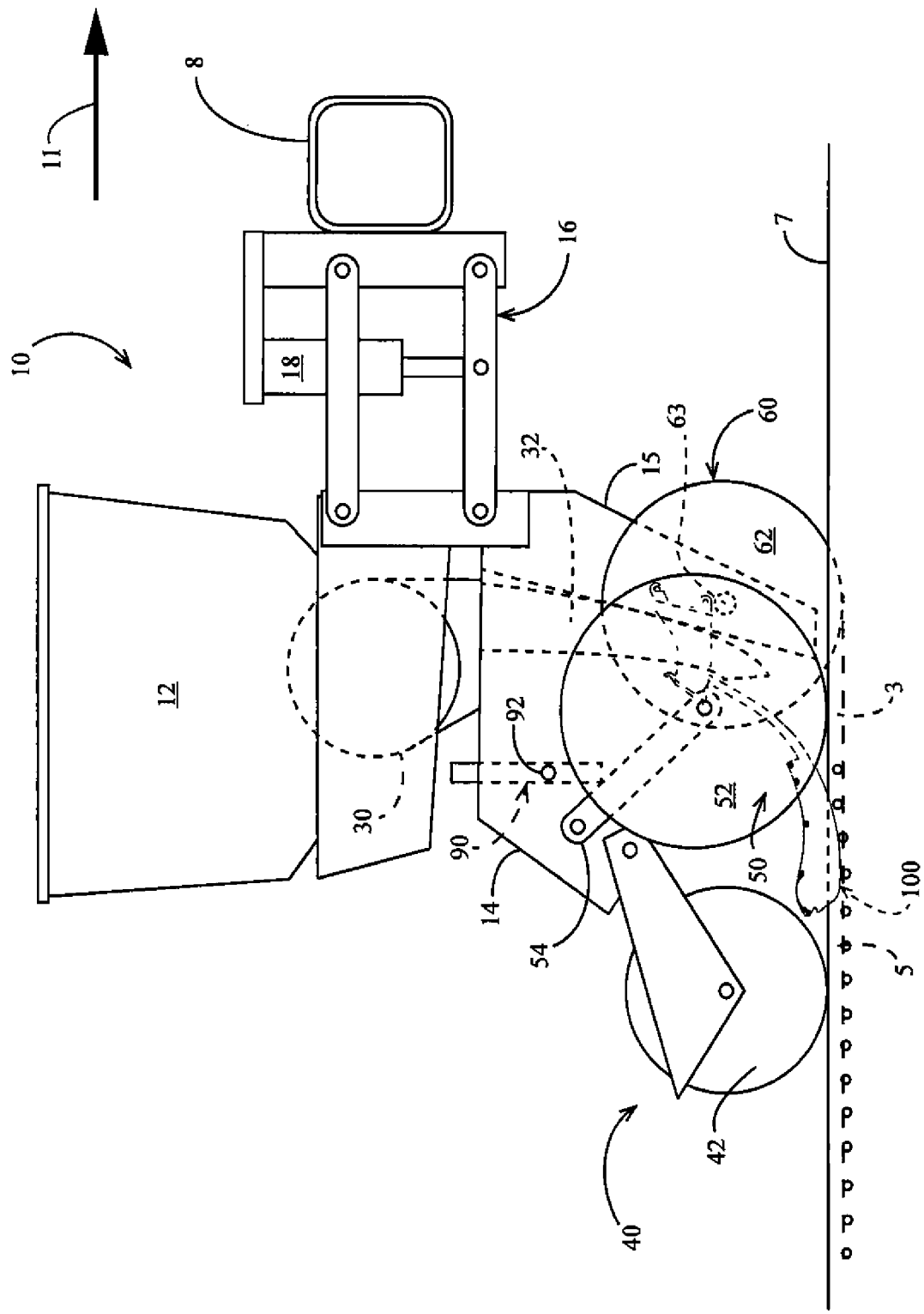
FIG. 1 is a right side elevation view of a row unit of an agricultural planter with an embodiment of a seed firmer mounted to a shank of the row unit.

Referring to the drawings, wherein like reference numerals designate identical or corresponding parts throughout the several views, FIG. 1 is a side elevation view of a row unit 10 of a conventional agricultural planter with a seed firmer 100 mounted to the row unit 10. It should be understood that the planter comprises a plurality of row units 10 mounted along the toolbar 8 in spaced relation. The row units 10 are mounted to the toolbar 8 by a parallel arm linkage 16 permitting the individual row units 10 to independently translate vertically with respect to the toolbar 8. The row unit 10 is shown as incorporating an actuator 18 mounted to the toolbar 8 and the parallel arm linkage 16 to apply supplemental downpressure to the row unit 10.

The row unit 10 includes a frame 14 having a downwardly extending shank 15. The frame 14 supports an opening disc assembly 60, a gauge wheel assembly 50 and a closing assembly 40. The opening assembly 60 includes two opening discs 62 rotatable about a shaft 63 supported by the shank 15. The opening discs 62 are disposed to cut a v-shaped trench 3 in the soil surface 7 as the row unit is drawn through the field in the direction of arrow 11. The gauge wheel assembly 50 includes two gauge wheels 52 pivotally mounted to the frame 14 by gauge wheel arms 54. A depth adjustment assembly 90 adjustably positions the gauge wheels 52 with respect to the opening discs 62 by contacting the gauge wheel arms 54 to limit the upward travel of the gauge wheel arms 54, thus limiting the depth of the trench 3 opened by the opening discs 62. The closing assembly 40 may include closing wheels 42 disposed to move soil back into the trench 3 to cover the seeds previously deposited as discussed below.

Continuing to refer to FIG. 1, seeds 5 are communicated from a hopper 12 to a seed meter 30 which dispenses seeds into the seed tube 32 extending downwardly and rearwardly toward the seed trench 3 between the opening discs 62 and the gauge wheels 52. The seed meter 30 may be any type of well known and commercially available seed meter, including for example, a vacuum-type meter such as disclosed in Applicant's co-pending international patent application no. PCT/US2012/030192 (Pub. No. WO/2012/129442), the disclosure of which is hereby incorporated by reference herein in its entirety.

In operation, as the planter is drawn through the field in the direction of arrow 11, the seeds 5 dispensed by the meter 30 are directed downwardly and rearwardly by the seed tube 32 where they are deposited in the seed trench 3 formed by the opening discs 62. A seed firmer 100 (discussed in detail below) presses the deposited seeds 5 into the soil at the bottom of the seed trench 3 before the seeds are covered with soil by the closing assembly 40.

Figure 2:
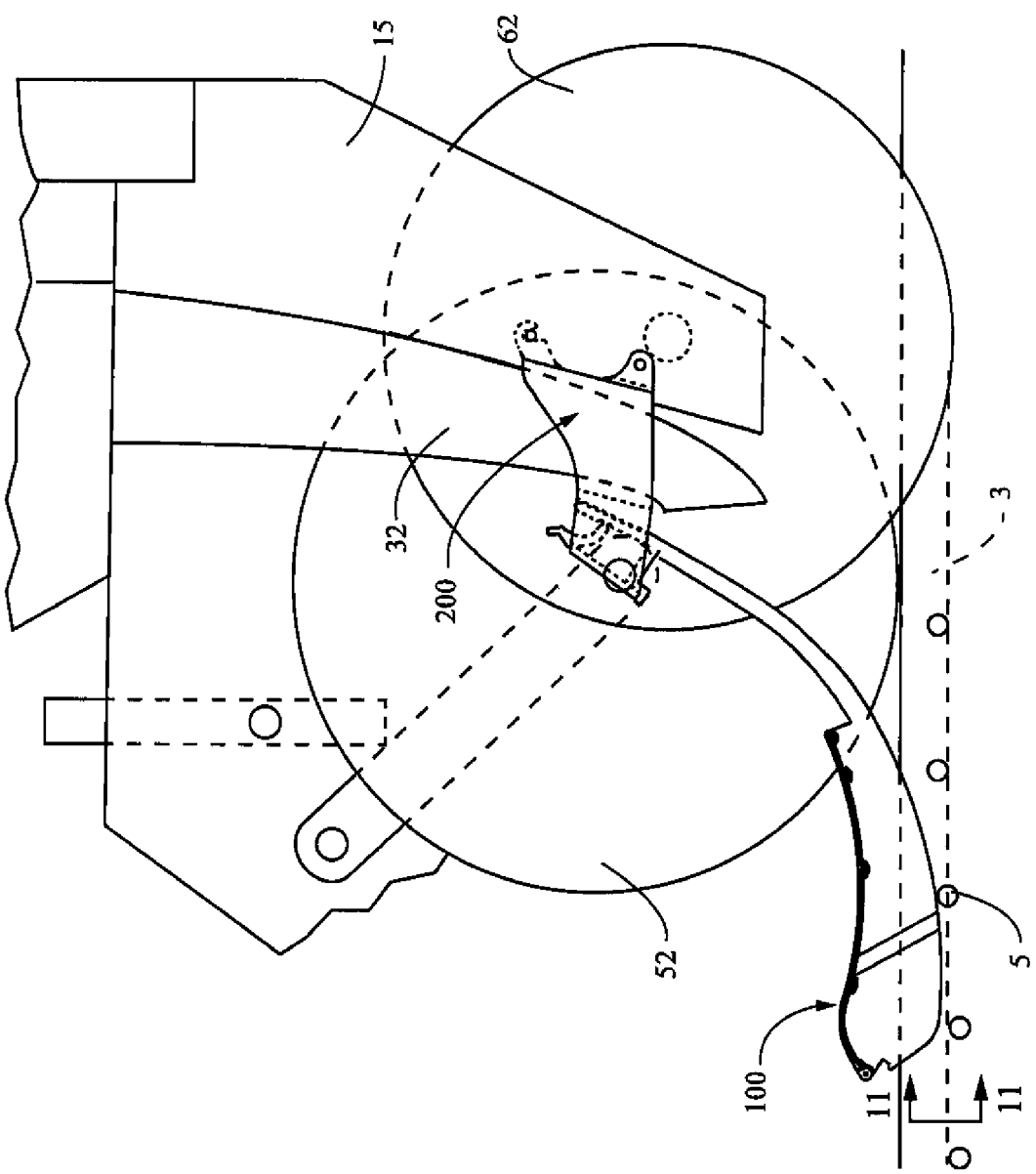
FIG. 2 is an enlarged view of FIG. 1 with the right opening disc and gauge wheel removed for clarity to show the seed firmer mounted to the shank of the row unit.

FIG. 2 is an enlarged view of FIG. 1 with the right side gauge wheel 52 and right side opening disc 62 showing an embodiment of the seed firmer 100 and the bracket 200 mounted to the shank 15 of the row unit 10.

Seed Firmer

Figure 3:
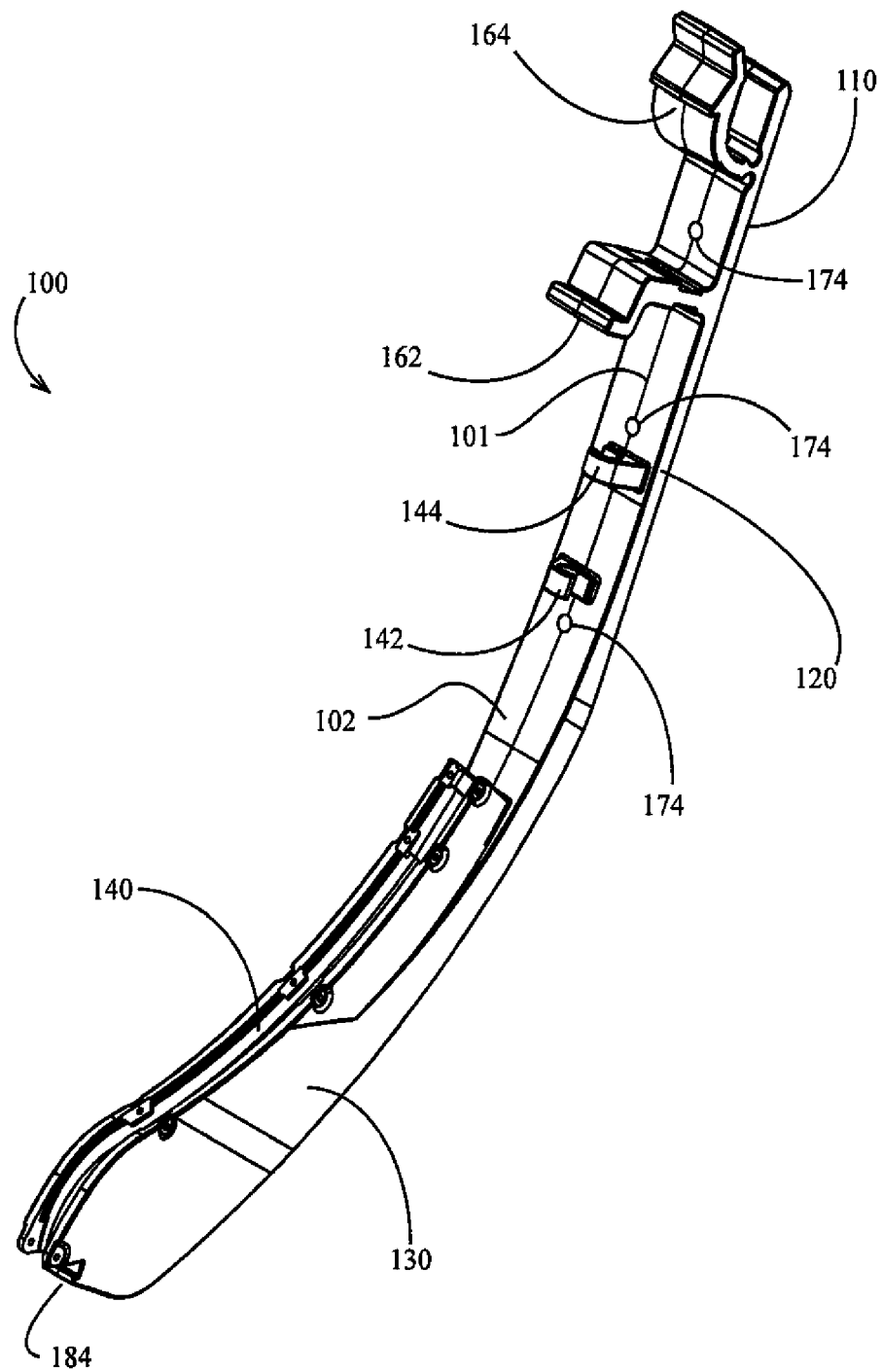
FIG. 3 is a rear perspective view of an embodiment of the seed firmer.
Figure 4:
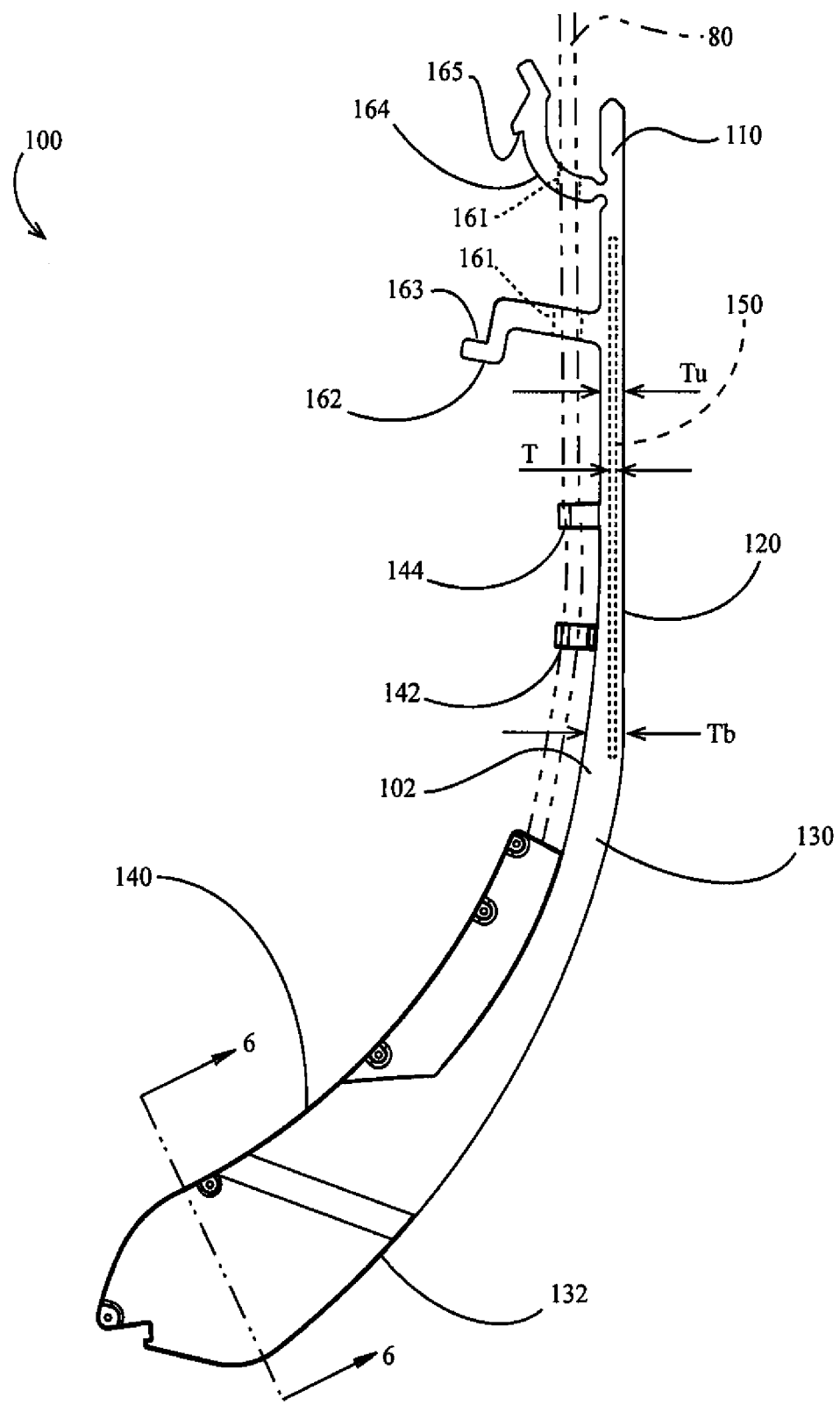
FIG. 4 is a right side elevation view of the seed firmer of FIG. 3.
Figure 5:
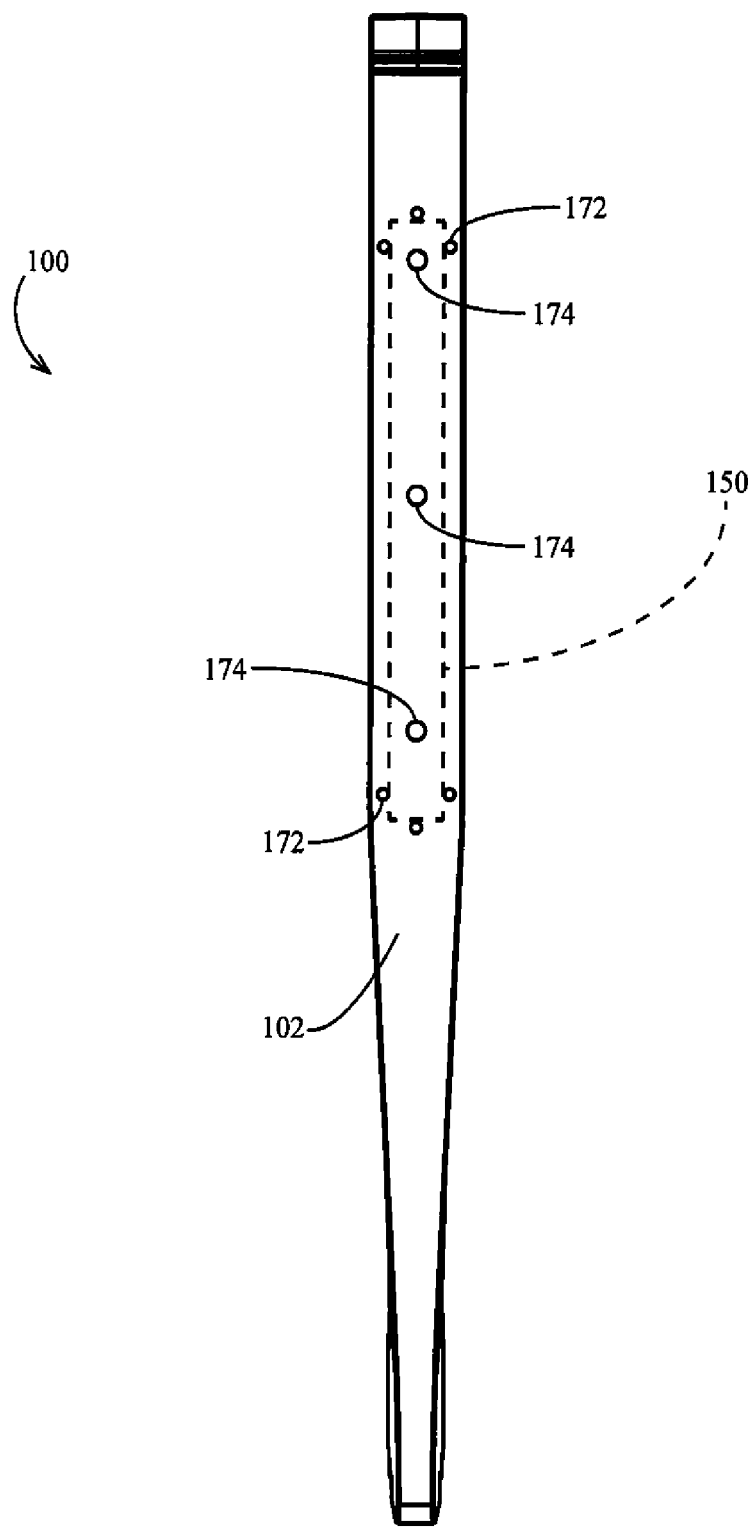
FIG. 5 is a front elevation view of the seed firmer of FIG. 3.

FIG. 3 is a rear perspective view of one embodiment of the seed firmer 100. FIG. 4 is a right side elevation view of the seed firmer 100 of FIG. 3 and FIG. 5 is a front elevation view of the seed firmer 100 of FIG. 3. The seed firmer 100 comprises a body 102 having a longitudinal centerline 101. The firmer body 102 is preferably comprised of plastic or other suitably resilient material which is durable to minimize rapid wear.

Figure 8:
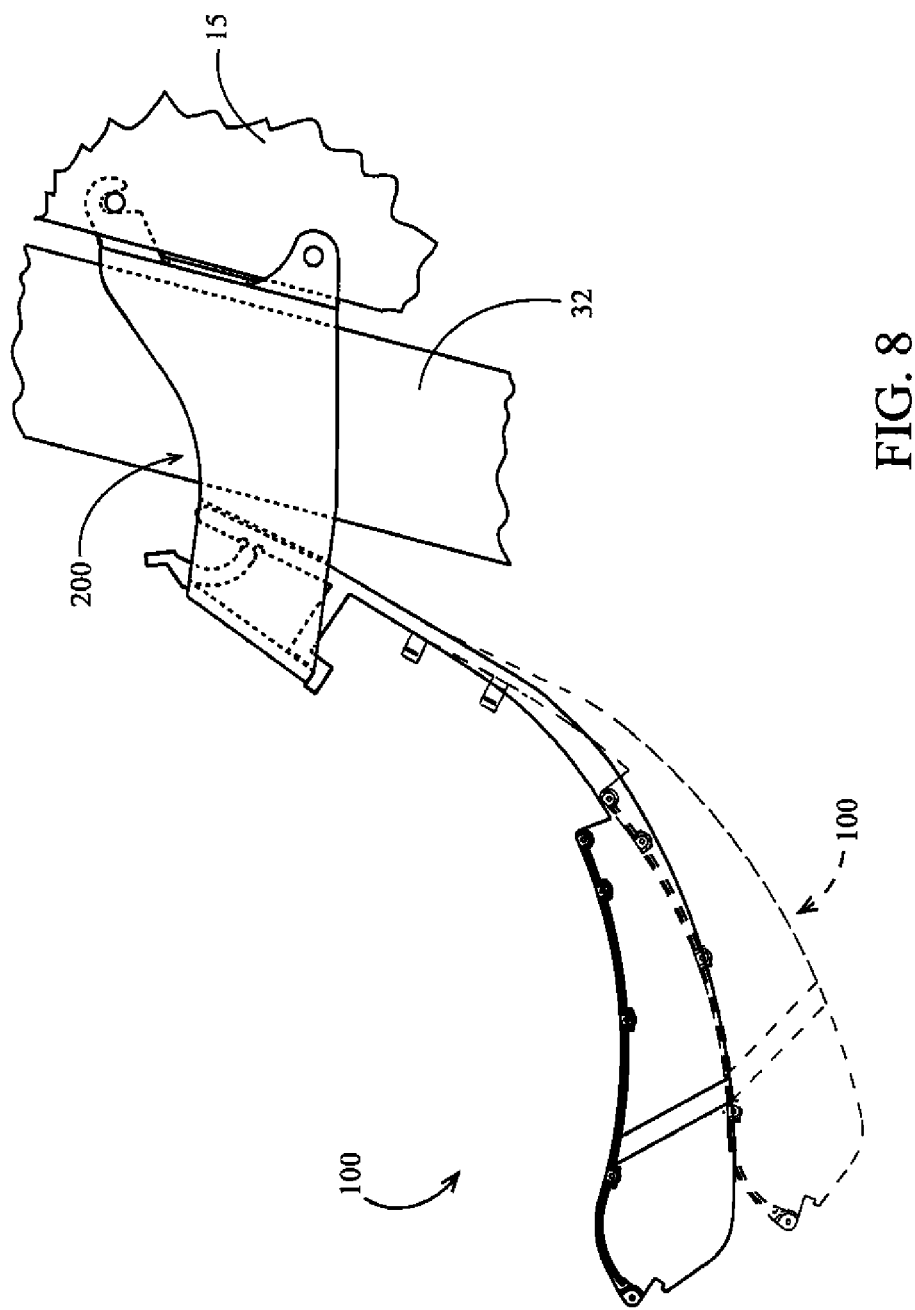
FIG. 8 shows the firmer flexing about the central portion of the firmer body.

The firmer body 102 includes an upper portion 110, a central portion 120, and a lower portion 130. The upper portion 110 preferably includes a lower bracket arm 162 and an upper bracket arm 164 for mounting the firmer body 102 to the mounting bracket 200 (discussed later). When mounted within the mounting bracket 200 the upper portion 110 is substantially restrained from bending or flexing. The lower portion 130 of the firmer body 102 has a larger section modulus than the upper and central portions 110, 120 of the firmer body 102 such that the lower portion 130 is relatively inflexible in relation to the central portion 120 of the firmer body 102. Thus, when the row unit 10 is lowered toward the soil such that the lower surface 132 of the lower portion 130 of the firmer body 102 engages the soil, the firmer 100 will tend to flex or deform elastically at the central portion 120 as best illustrated in FIG. 8. As the central portion 120 flexes or elastically deforms, the central portion 120 imposes a moment on the lower portion 130 causing the lower surface 132 of the resilient firmer body 102 to be biased downwardly toward the soil such that as the lower surface 132 passes over the deposited seeds 5 in the bottom of the trench 3, the deposited seeds are firmly pressed into the soil ensuring good seed-to-soil contact.

In a preferred embodiment, the upper portion 110 has a thickness $T_u$ (FIG. 4) of preferably approximately 0.25 inches. A thickness $T_b$ (FIG. 3) of a transition area between the central portion 120 and the lower portion 130 is preferably approximately 0.9 inches.

To add stiffness to the seed firmer 100, the seed firmer body 102 preferably includes an insert 150 made of a resilient material having a greater stiffness than the material used for the seed firmer body 102. In a preferred embodiment, the insert 150 is made of spring steel. The insert 150 has a thickness T (FIG. 4) and may comprise a single member or multiple layers (discussed later). The insert 150 is preferably oriented within the firmer body 102 as illustrated in FIGS. 4 and 5 and extends through the central portion 120 and into the upper portion 110 and lower portion 130 of the seed firmer body 102. It should be appreciated that the stiffness of the firmer 100 is therefore directly related to the thickness of the insert 150. The thickness T may be between about 0.01 and about 0.07 inches and preferably about 0.04 inches.

In embodiments where the insert 150 is made of multiple layers, a thickness T of the insert 150 is preferably approximately between 0.08 and 0.1 inches and preferably about 0.09 inches, with the insert 150 preferably comprising three substantially identical insert pieces stacked along the direction of thickness T with each insert piece having a thickness of approximately 0.03 inches. By using multiple layers, the insert pieces are able to slide relative to one another as the firmer 100 flexes during use.

The firmer body 102 is preferably overmolded around the insert 150 using an injection molding process. During injection molding of the firmer body 102, pins (not shown) preferably retain the insert 150 vertically and horizontally within the mold resulting in upper and lower arrays of pin holes 172 in the resulting seed firmer body 102. Also during injection molding of the seed firmer body 102, pins (not shown) preferably engage the insert 150 from the front side and rear side of the insert to prevent movement and bending of the insert 150 during molding resulting in pin holes 174 (FIGS. 3 and 5) in the front and rear sides of the firmer body 102.

Figure 6:
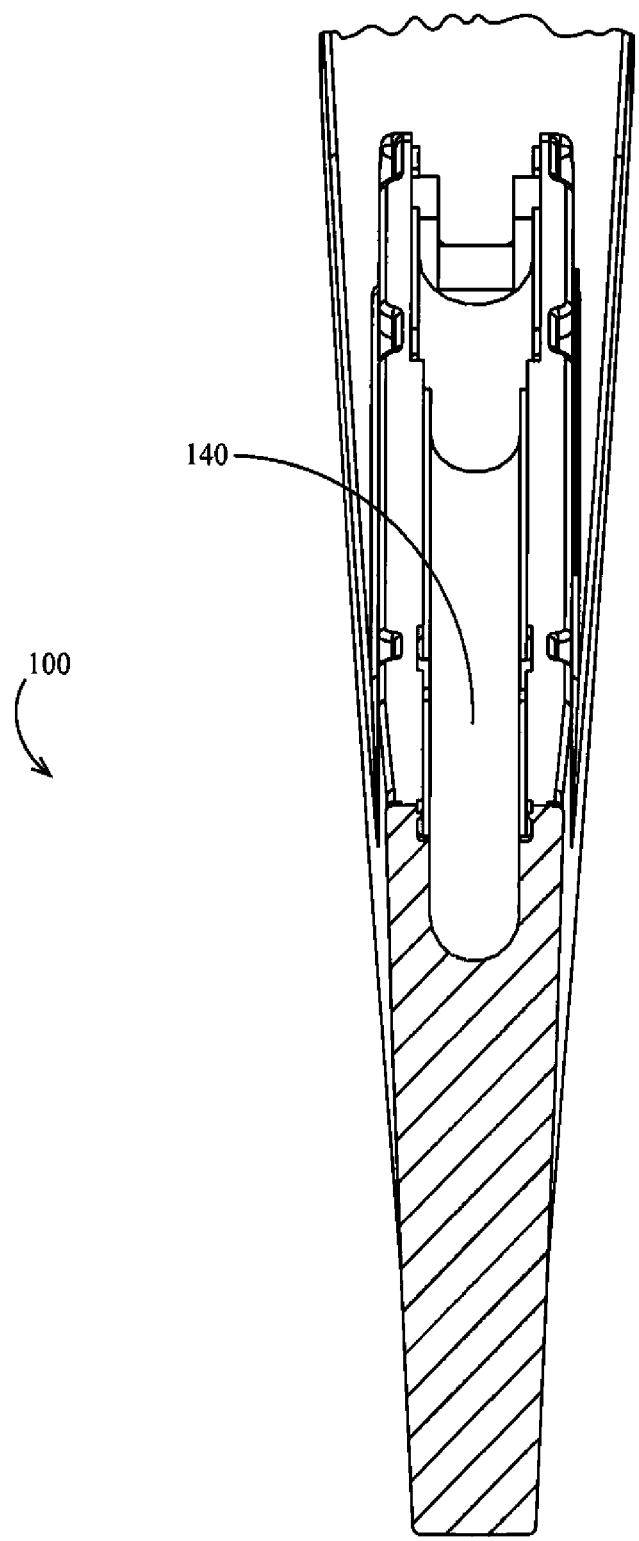
FIG. 6 is a cross-sectional view of the seed firmer as viewed along line 6-6 of FIG. 4.

The seed firmer 100 is preferably adapted to support a liquid conduit 80 (FIG. 4) for depositing liquid near a trailing end of the seed firmer 100. The upper and lower bracket arms 162, 164 may include apertures 161 through which the conduit 80 may extend. The conduit 80 may be supported along the firmer body 102 by hooks 144 and 142. The top surface 134 of the lower portion 130 of the firmer body 102 preferably includes a channel 140 (FIGS. 3 and 6) sized to receive the liquid conduit 80. The end of the liquid conduit 80 may include a nozzle 82 retained in position by a notch 184 in the lower portion 130.

Figure 9:
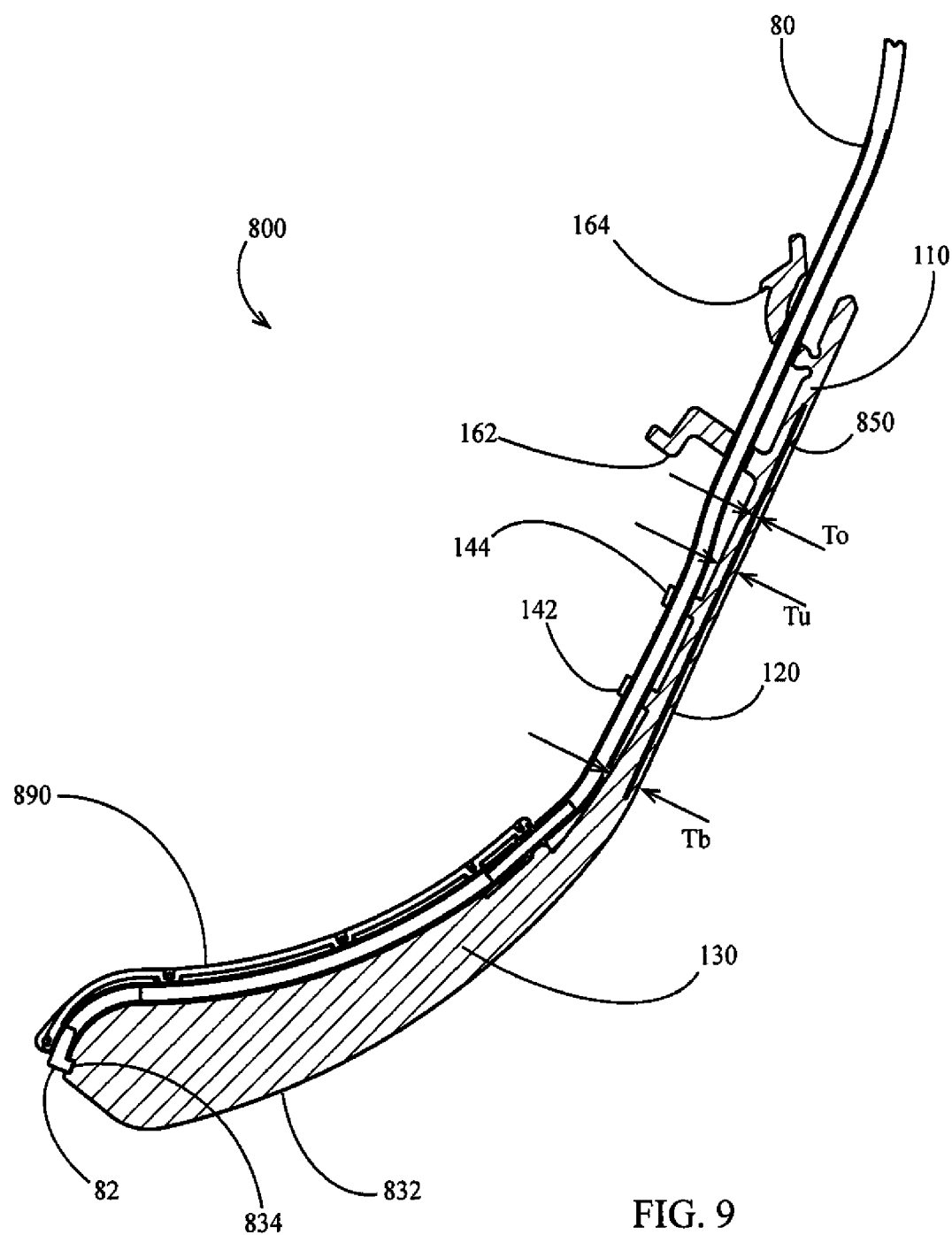
FIG. 9 is a cross-sectional view of another embodiment of a seed firmer.

Referring to FIG. 9, another embodiment of a seed firmer 100A is illustrated in cross-section. As in the previous embodiment, the seed firmer 100A comprises a firmer body having an upper portion 110, a central portion 120 and a lower portion 130. An insert 150 is overmolded or otherwise provided within the seed firmer body 102 and, as in the previous embodiment, the insert 150 has a greater effective stiffness than the material comprising the firmer body 102. Also as with the previous embodiment, the insert 150 extends through the central portion and into the upper and lower portions 110, 130 of the firmer body 102. Also as in the previous embodiment, a liquid conduit 80 is preferably secured in place by the hooks 142, 144 and by apertures 161 through the bracket arms 162, 164. However, in the embodiment of FIG. 9, the liquid conduit 80 is preferably releasably retained over the top surface of the lower portion 130 by a cover 180 which may be releasably secured over the channel 140 formed in the top surface of the lower portion 130 of the firmer body as in the previous embodiment or the cover 180 may be an attachment removably or fixedly secured along the top surface of the lower portion 130. As in the previous embodiment, a nozzle 82 at the end of the liquid conduit 80 may be retained in position by a notch 184 in the lower portion 130.

Figure 10:
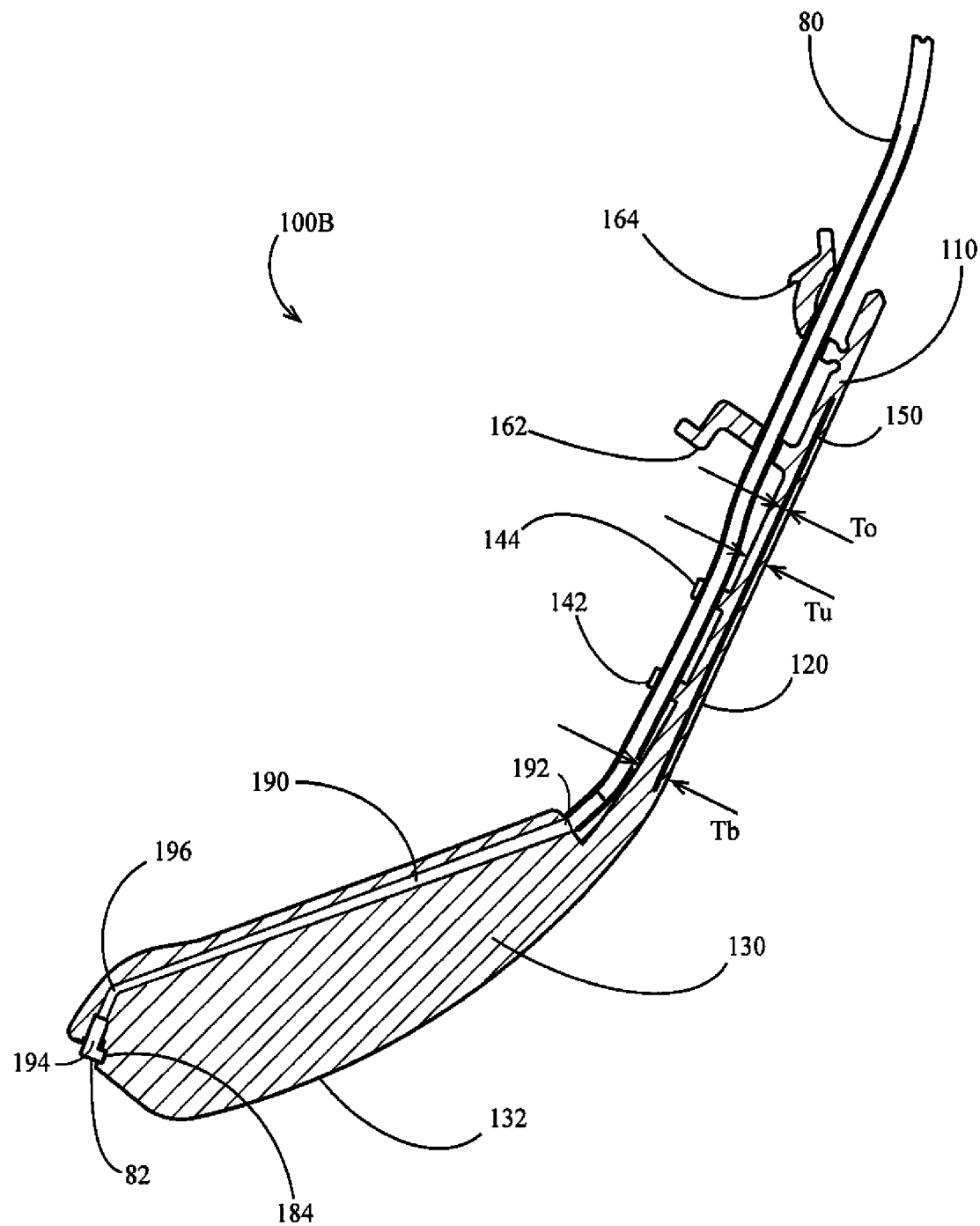
FIG. 10 is a cross-sectional view of yet another embodiment of a seed firmer.

Referring to FIG. 10, another embodiment of a seed firmer 100B is illustrated in cross-section. In this embodiment, the seed firmer 100B is generally similar to either of the previous embodiments 100, 100A except that instead of an open channel 140 or a cover 180, the seed firmer includes an elongated cavity 190 formed along the top surface of the lower portion 130. The elongated cavity 190 preferably includes an inlet end 192 at a forward end of the lower portion 130 and an outlet end 194 at a rearward end of the lower portion 130. The elongated cavity 190 may comprise an overmolded steel tube or the cavity may simply be a void formed along the top surface of the lower portion 130. The conduit 80 may extend through the cavity 190 or the conduit 80 may terminate at the inlet end 192 such that the liquid flows directly through the cavity 190. The cavity 190 preferably includes a bend 196 for directing the flow of liquid, or the terminal end of the liquid conduit 80 (with or without a nozzle) downwardly at the rearward end of the firmer 100B.

Figure 11:
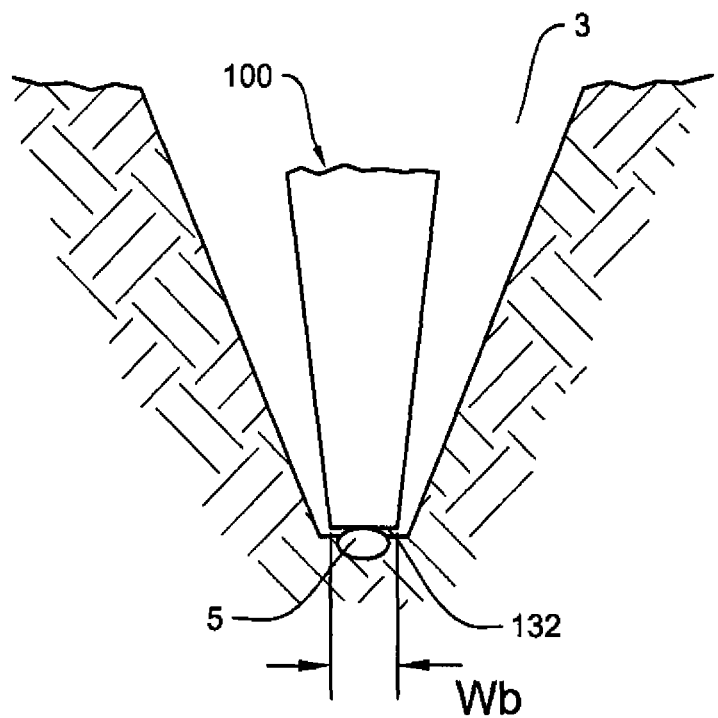
FIG. 11 is an enlarged cross-sectional view of the firmer within the seed trench as viewed along lines 11-11 of FIG. 2.
Figure 12:
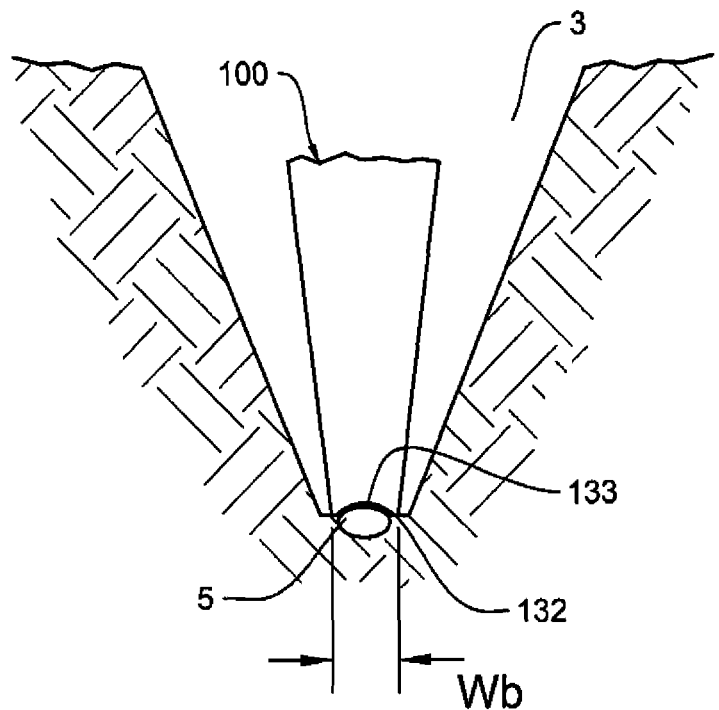
FIG. 12 is the same view as FIG. 11 illustrating an alternative embodiment of the lower surface of the seed firmer.

FIG. 11 is a cross sectional view of the seed firmer 100, 100A, 100B positioned within the seed trench as viewed along lines 11-11 of FIG. 2. The lower surface 132 preferably has a substantially flat portion having a width Wb greater than the width of the deposited seeds 5 in the trench but the width Wb preferably substantially equal to or less than the width of the bottom of the trench 3. In FIG. 12, an alternative embodiment of a lower surface 132 of the firmer body 102 is shown in which the lower surface 132 includes a concave recess 133 such that the seed 5 is partially received within the recess 133 when the lower surface 132 engages the bottom of the trench.

Seed Firmer Mounting Bracket

Figure 7:
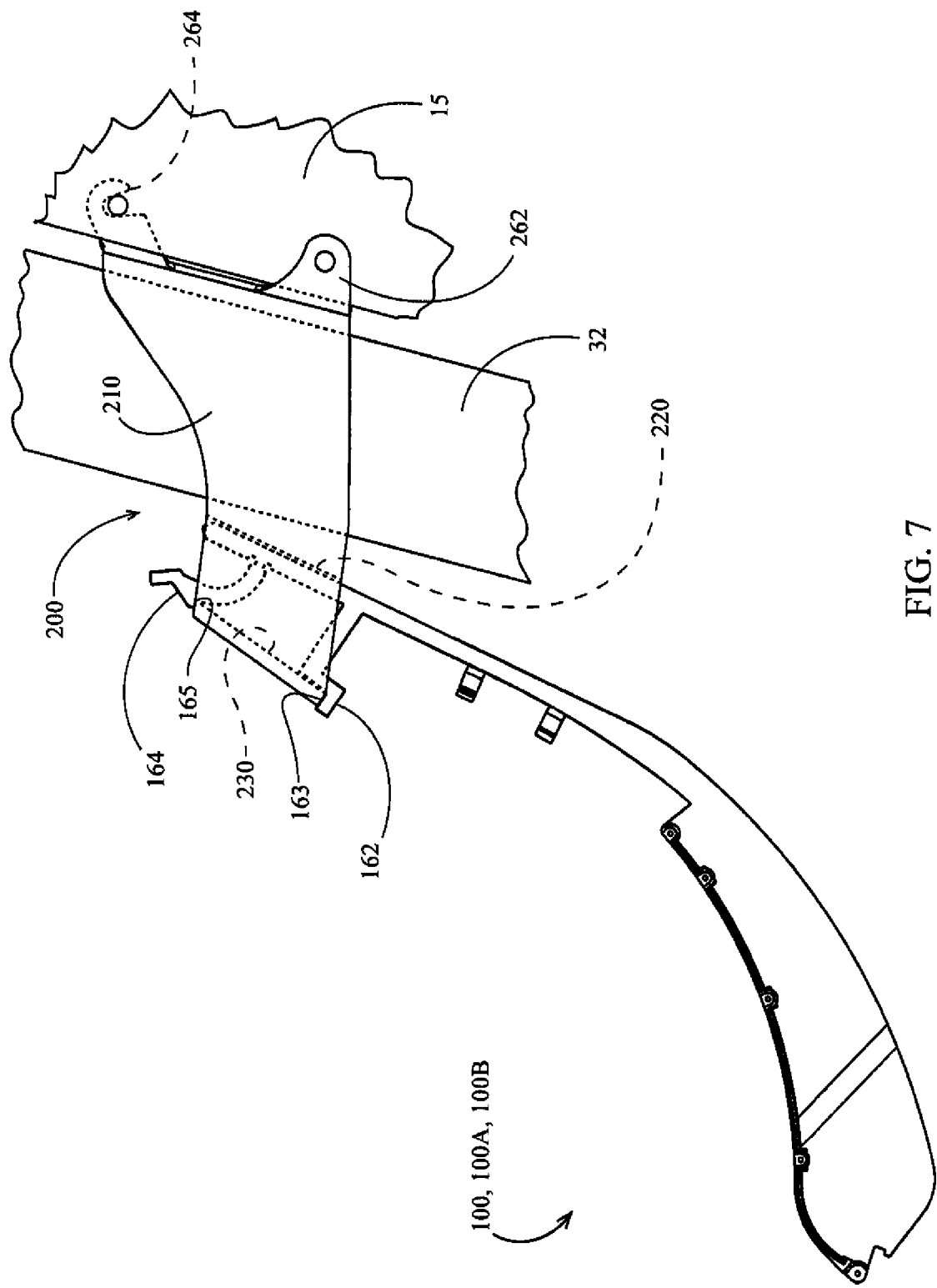
FIG. 7 is an enlarged view of FIG. 2 showing an embodiment of the seed firmer and mounting bracket for mounting the seed firmer to the shank of the row unit frame.

Referring to FIG. 7, the mounting bracket 200 is illustrated in more detail supporting the seed firmer 100, 100A, 100B. The bracket preferably includes left and right sidewalls 210 transversely spaced to accommodate the seed tube 32. The bracket 200 is preferably mounted to each side of the shank 15 by a bolt or shaft extending through forwardly projecting mounting ears 262. The bracket 200 may also include a forwardly projecting upper hook 264 for hooking over an existing shaft or pin on the shank 15 or alternatively a second pair of forwardly extending ears (not shown) may be provided instead of an upper hook depending on the make and model of the planter to which the bracket 200 is to be mounted.

The rearward end of the bracket 200 preferably includes a forward surface 220 and a back surface 230. The forward surface 220 supports a forward side of the upper portion 110 of the firmer body 102. The back surface 230 is received between the upper and lower bracket arms 162, 164. The lower bracket arm 162 includes a seat 163 (see also FIG. 4) which receives a bottom edge of the back surface 230. The upper bracket arm 164 includes a lip 165 (see also FIG. 4) which engages the top edge of the back surface 230.

To attach the firmer 100 to the bracket 200, the resilient upper bracket arm 164 is bent upwardly permitting the upper portion 110 of the firmer body 102 and the upper bracket arm 164 to pass upwardly between the forward surface 220 and back surface 230 of the bracket 200 until the seat 163 of the lower bracket arm 162 engages the bottom edge of the back surface 230. With the forward side of the upper portion 110 engaging the forward surface 220 of the bracket 200, and with the bottom edge of the back surface 230 seated on the seat 163, the bending force exerted on the upper bracket arm 164 is released. The resiliency of the upper bracket arm 164 biases the upper bracket arm downwardly clamping the back surface 230 between the lip 165 and the seat 163. It should be appreciated that the upper portion 110 is thereby substantially restrained such that the upper portion 110 is substantially inflexible. To remove the seed firmer 100 from the bracket 200, the upper bracket arm 164 is bent upwardly (to the right on the view of FIG. 7) until the upper portion 110 can be lowered and released from the bracket 200.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A seed firmer in combination with a row unit of an agricultural planter, the row unit configured to open a seed trench in a soil surface and to deposit seeds in the seed trench as the agricultural row unit advances through a field, the seed firmer comprising:
   a resilient body, having an upper portion, a central portion and a lower portion, wherein said central portion of said resilient body bends resiliently about a horizontal axis such that said lower portion deflects relative to said upper portion of said resilient body, said upper portion of said resilient body operably mounted to the row unit such that said lower portion of said resilient body is at least partially disposed in the open seed trench, said lower portion firming the deposited seeds into the bottom of the open seed trench as said lower portion passes over the deposited seeds as the row unit advances through the field;
   a resilient insert, having a housed portion housed inside of said resilient body, said housed portion extending through said central portion of said resilient body, said resilient insert having a greater effective stiffness than said central portion of said resilient body.

2. The seed firmer of claim 1, wherein said housed portion extends into said upper portion of said resilient body.

3. The seed firmer of claim 1, wherein said housed portion extends into said lower portion of said resilient body.

4. The seed firmer of claim 1, wherein said housed portion extends into said lower portion and said upper portion of said resilient body.

5. The seed firmer of claim 1, wherein said resilient body includes a channel for receiving a liquid application tube.

6. The seed firmer of claim 5, wherein said resilient body includes a hook for retaining said liquid application tube.

7. The seed firmer of claim 1, wherein said upper portion of said resilient body includes a first flexible tab releasably mounting said upper portion of said resilient body to a mounting bracket mounted to the row unit.

8. The seed firmer of claim 7, wherein said mounting bracket is mounted to a shank of the row unit.

9. The seed firmer of claim 7, wherein said mounting bracket extends around a seed tube of the row unit.

10. The seed firmer of claim 8, wherein said mounting bracket extends around a seed tube of the row unit.

11. The seed firmer of claim 1, wherein said resilient insert comprises a metal sheet.

12. The seed firmer of claim 11, wherein said resilient insert is overmolded within said resilient body.

13. The seed firmer of claim 11, wherein said housed portion is overmolded within said resilient body.

14. The seed firmer of claim 1, wherein said resilient insert is overmolded within said resilient body.

15. The seed firmer of claim 1, wherein said housed portion is overmolded within said resilient body.

16. The seed firmer of claim 1, wherein said resilient insert comprises a plurality of stacked metal sheets.

17. The seed firmer of claim 1, wherein said housed portion comprises a plurality of stacked metal sheets.

18. The seed firmer of claim 1, wherein said resilient body includes a first plurality of pin holes, said first plurality of pin holes disposed adjacent to said resilient insert.

19. The seed firmer of claim 18, wherein said first plurality of pin holes are formed by a first fixture during a manufacturing process, said first fixture preventing said resilient insert from moving in a first direction during said manufacturing process.

20. The seed firmer of claim 19, wherein said resilient body includes a second plurality of pin holes, said second plurality of pin holes disposed adjacent to said resilient insert, wherein said second plurality of pin holes are formed by a second fixture during a manufacturing process, said second fixture preventing said resilient insert from moving in a second direction during said manufacturing process.

21. The seed firmer of claim 1, wherein a thickness of said resilient insert is between 0.01 and 0.07 inches.

22. The seed firmer of claim 1, wherein said resilient insert is made of spring steel.

* * * * *